(12) United States Patent
Tachimori

(10) Patent No.: US 9,569,166 B2
(45) Date of Patent: Feb. 14, 2017

(54) MUSIC REPRODUCING APPARATUS

(71) Applicant: Onkyo Corporation, Osaka (JP)

(72) Inventor: Nobuya Tachimori, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 0 days.

(21) Appl. No.: 14/851,108

(22) Filed: Sep. 11, 2015

(65) Prior Publication Data

US 2016/0086611 A1    Mar. 24, 2016

(30) Foreign Application Priority Data

Sep. 20, 2014  (JP) ................................ 2014-192405

(51) Int. Cl.
| | | |
|---|---|---|
| *G10L 19/00* | (2013.01) | |
| *G10L 25/00* | (2013.01) | |
| *G10L 21/00* | (2013.01) | |
| *G10L 21/04* | (2013.01) | |
| *G06F 3/16* | (2006.01) | |
| *H04M 1/725* | (2006.01) | |
| *G11B 20/10* | (2006.01) | |

(52) U.S. Cl.
CPC ........... *G06F 3/16* (2013.01); *G11B 20/10527* (2013.01); *H04M 1/72558* (2013.01); *H04M 1/72527* (2013.01)

(58) Field of Classification Search
None
See application file for complete search history.

(56) References Cited

U.S. PATENT DOCUMENTS

| | | | | |
|---|---|---|---|---|
| 2005/0113058 A1* | 5/2005 | Gosieski, Jr. | .......... | H04H 60/04 455/345 |
| 2014/0223470 A1* | 8/2014 | Kim | ................... | H04N 21/4131 725/32 |

FOREIGN PATENT DOCUMENTS

JP     2014-127925      7/2014

OTHER PUBLICATIONS

Japanese Final Rejection with translation to corresponding Japanese Application No. 2014-192045 mailed Feb. 9, 2015.
Japanese Office Action with translation to corresponding Japanese Application No. 2014-192045 mailed Oct. 27, 2015.
Japanese Decision to Grant with translation to corresponding Japanese Application No. 2014-192045 mailed Apr. 26, 2016.
AV Review, "DSD 3", Dec. 25, 2013 and partial English translation.
"MY-D3000", Jun. 11, 2013 with English translation, http://www.glasstone.co.jp/myd3000_dsd.htm.

* cited by examiner

*Primary Examiner* — Marcus T Riley
(74) *Attorney, Agent, or Firm* — Renner, Otto, Boisselle & Sklar, LLP

(57) ABSTRACT

In a smartphone that outputs PCM data and DSD data of different data format from PCM data to a USB DAC, to prevent generation of noises from the USB DAC when the smartphone accepts stopping instruction of outputting digital audio data to the USB DAC while outputting DSD data to the USB DAC.
A controller 11 outputs mute data representing silence of DSD data to a USB DAC 2 when it accepts pausing instruction while outputting DSD data to the USB DAC 2.

6 Claims, 8 Drawing Sheets

Fig. 2

| 16:13 | |
|---|---|
| ALBUM TITLE | |
| TITLE A | 4:05 |
| TITLE B | 3:57 |
| TITLE C | 4:24 |
| TITLE D | 2:56 |
| TITLE E | 5:03 |
| TITLE F | 3:25 |
| TITLE G | 6:32 |

//MUSIC REPRODUCING APPARATUS

BACKGROUND OF THE INVENTION

1. Field of the Invention

The present invention relates to a music reproducing apparatus.

2. Description of the Related Art

A music reproducing program that allows a smartphone or a tablet PC to function as a music reproducing apparatus is present. The music reproducing program allows the smartphone to reproduce music from a speaker of the smartphone and to output digital audio data from the smartphone to an external USB DAC (D/A converter). Conventionally, as digital audio data, PCM data (first digital audio data) that is encoded by PCM (Pulse Code Modulation) system in which sampling frequency is 44.1 kHz and the number of quantum bits is 16 bits is main stream. In recent years, there has been DSD data (second digital audio data) that is encoded by a 1-bit DSD (Direct Stream Digital) system in which a sampling frequency is 2.8224 MHz (=44.1 kHz×64) as digital audio data.

When the music reproducing program allows the smartphone to output DSD data from the smartphone to the USB DAC, the music reproducing program occasionally allows the smartphone to output the DSD data from the smartphone to the USB DAC via USB using frames of PCM data. This system is called DoP (DSD Audio over PCM Frames). For example, a USB audio class supports PCM data, but does not support DSD data. For this reason, when the smartphone and the USB DAC execute communication that supports the USB audio class, DSD data is output from the smartphone to the USB DAC by DoP.

FIG. 6 is a diagram illustrating DSD data that is stored in frames of PCM data. The frames of PCM data is configured by 24 bits. DSD data is stored in 16 bits of 24 bits. A marker that includes information representing that it is DSD data is stored in 8 bits of 24 bits. The USB DAC can judge that the digital audio data that is output is DSD data by the marker.

FIG. 7 is a diagram illustrating a concept of DoP output. The smartphone outputs DSD data to channel for PCM data of L channel of the USB DAC and to channel for PCM data of R channel of the USB DAC by DoP. In DoP output, DSD data is output from the smartphone to the USB DAC while DSD data is made look like PCM data. For this reason, noises are generated at time of switching from output of PCM data to output of DSD data (DoP output) or from output of DSD data to output of PCM data. To repress noises, the music reproducing program is designed so that the switching from output of PCM data to output of DSD data (DoP output) or from output of DSD data to output of PCM data is not executed as much as possible.

In the conventional music reproducing apparatus, when DSD data is output from the smartphone to the USB DAC (DoP output), stopping instruction of outputting (for example, so-called "pause") from a user is accepted and the music reproducing apparatus allows the smartphone to stop the USB DAC (pausing process). At this time, as illustrating in FIG. 8, a device driver occasionally inserts PCM data automatically. For this reason, switching from output of DSD data (DoP output) to output of PCM data occurs and noises are generated from the USB DAC.

SUMMARY OF THE INVENTION

It is an object of the present invention to prevent generation of noises from a D/A converter when stopping instruction of digital audio data is accepted while second digital audio data is being output to the D/A converter in a music reproducing apparatus that outputs first digital audio data and the second digital audio data of different data format from the first digital audio data.

A music reproducing apparatus comprising: a controller for outputting digital audio data that includes first digital audio data and second digital audio data of different data format from the first digital audio data to a D/A converter, for accepting stopping instruction of outputting the digital audio data to the D/A converter, and for controlling the D/A converter, wherein the controller outputs mute data representing silence of the second digital audio data to the D/A converter when it accepts the stopping instruction while outputting the second digital audio data to the D/A converter.

In the present invention, a controller outputs mute data representing silence of a second digital audio data to a D/A converter when it accepts stopping instruction while outputting the second digital audio data to the D/A converter. Therefore, since the silence is output from the D/A converter according to the mute data, generation of noises is prevented when the music reproducing apparatus accepts the stopping instruction of digital audio data while outputting the second digital audio data to the D/A converter. "Stop" includes normal "stop" and "pause".

Preferably, wherein the controller stops the D/A converter after it starts outputting the mute data to the D/A converter and predetermined time passes.

While the mute data is being output, the D/A converter converts the mute data (digital audio data) into the silence (analog audio data). For this reason, electric power is consumed in the D/A converter. In the present invention, the controller stops the D/A converter after it starts outputting the mute data to the D/A converter and predetermined time passes. Thus, since the D/A converter stops, electric power consumption of the D/A converter can be repressed.

Preferably, wherein the controller stops the D/A converter when it accepts the stopping instruction while outputting the first digital audio data to the D/A converter.

When the stopping instruction is accepted while the first digital audio data is being output to the D/A converter and the D/A converter is stopped, noises are not generated from the D/A converter. For this reason, in the present invention, when the controller accepts the stopping instruction while outputting the first digital audio data to the D/A converter, it stops the D/A converter.

Preferably, further comprising: a display section, wherein the controller further controls display of the display section, and allows the display section to display that outputting the digital audio data to the D/A converter is in a stopping state when it accepts the stopping instruction.

In the present invention, when the controller accepts the stopping instruction, it allows a display section to display that outputting the digital audio data to the D/A converter is in a stopping state. Thus, a user understands that outputting the digital audio data to the D/A converter is stopped.

Preferably, wherein the controller stores a marker that includes information representing it is the second digital audio data and the second digital audio data in frames of the first digital audio data and outputs the marker and the second digital audio data to the D/A converter.

In the present invention, the controller stores a marker that includes information representing that it is the second digital audio data and the second digital audio data in frames of the first digital audio data and outputs the marker and the second digital audio data to the D/A converter. Thus, in communication between the music reproducing apparatus and the D/A converter according to a USB audio class that supports the first digital audio data while does not support the second digital audio data, the second digital audio data can be output from the music reproducing apparatus to the D/A converter.

Preferably, wherein the first digital audio data is PCM data, and the second digital audio data is DSD data.

In the present invention, the controller outputs the mute data representing the silence of DSD data to the D/A converter when it accepts the stopping instruction while outputting DSD data to the D/A converter. Therefore, since the silence is output from the D/A converter according to the mute data, the generation of noises is prevented when the music reproducing apparatus accepts the stopping instruction of the digital audio data while outputting DSD data to the D/A converter.

According to the present invention, in the music reproducing apparatus that outputs the first digital audio data and the second digital audio data of different data format from the first digital audio data to the D/A converter, the generation of noises from the D/A converter can be prevented when the music reproducing apparatus accepts the stopping instruction of the digital audio data while outputting the second digital audio data to the D/A converter.

BRIEF DESCRIPTION OF THE DRAWINGS

FIG. 2 illustrates a displaying example of information of digital audio data.

DETAILED DESCRIPTION OF THE PREFERRED EMBODIMENTS

Figure 1:
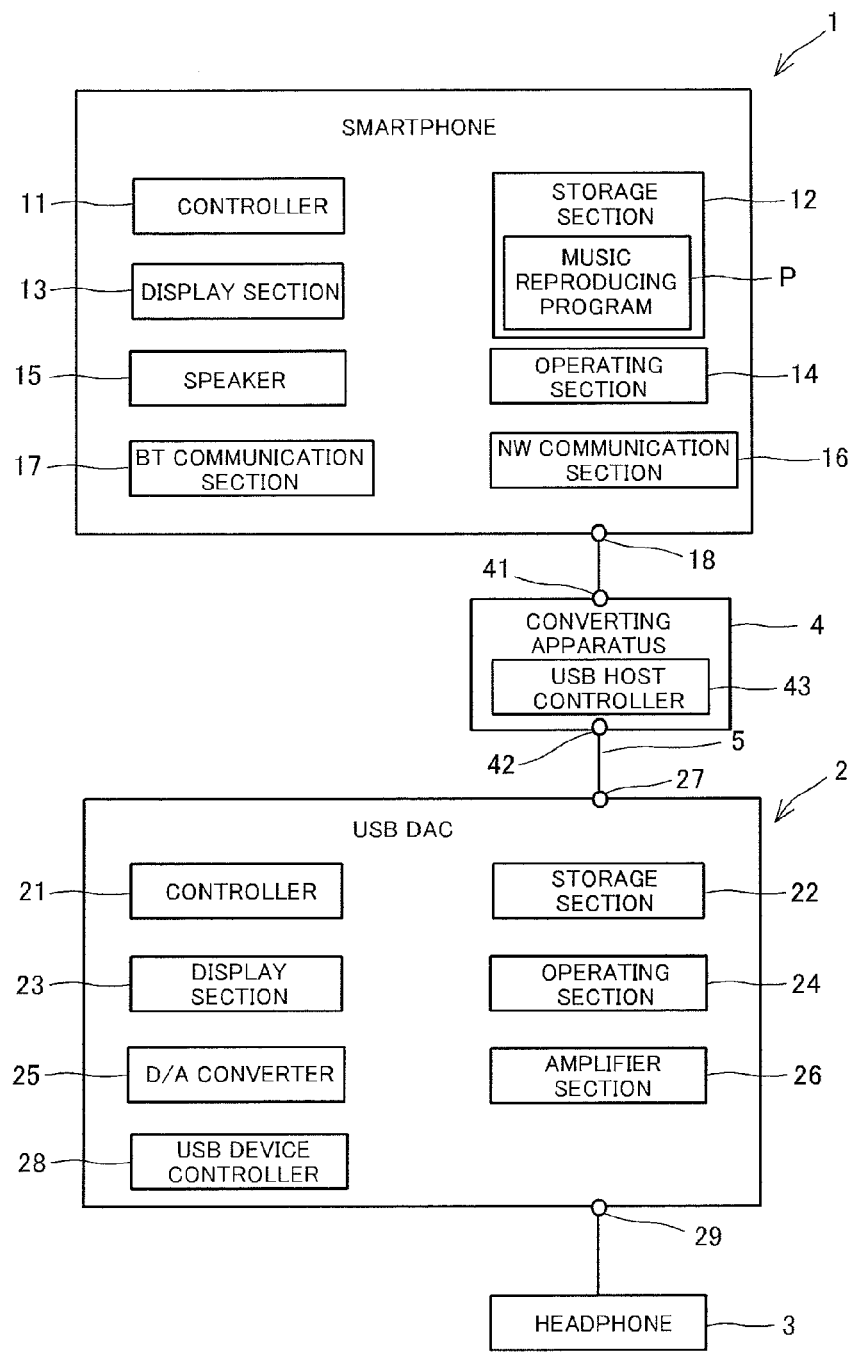
FIG. 1 is a block diagram illustrating a constitution of a smartphone according to an embodiment of the present invention.

An embodiment of the present invention is described below. FIG. 1 is a block diagram illustrating a constitution of a smartphone according to an embodiment of the present invention. A smartphone 1 is connected to a USB DAC 2 (D/A converter). The smartphone 1 functions as a music reproducing apparatus that outputs digital audio data to the USB DAC 2 according to execution of a music reproducing program P stored in a storage section 12. The USB DAC 2 converts the digital audio data that is output from the smartphone 1 into analog audio data. The USB DAC 2 amplifies converted analog audio data and outputs amplified analog audio data to a headphone 3. The headphone 3 outputs audio that includes music based on the analog audio data that is output from the USB DAC 2 toward the outside.

(Smartphone 1)

The smartphone 1 includes a controller 11, the storage section 12, a display section 13, an operating section 14, a speaker 15, a network communication section (hereinafter, "NW communication section") 16, a Bluetooth (registered trademark) communication section (hereinafter, "BT communication section") 17, and a connector 18. For example, the smartphone 1 is iPhone (registered trademark) that loads iOS as an OS (Operating System) program and is made by Apple inc.

The controller 11 controls respective sections composing the smartphone 1 according to a control program, an OS program or application programs that include the music reproducing program P. The controller 11 outputs the digital audio data to the USB DAC 2 according to the music reproducing program P. Process that the controller 11 executes according to the music reproducing program P is described latterly.

The storage section 12 is composed of a RAM (Random Access Memory) that functions as a main memory of the controller 11, a ROM (Read Only Memory) for storing the control program and a flash memory for storing programs such as the OS program and the application programs including the music reproducing program P, and various data such as the digital audio data. The storage section 12 is not limited to the illustrated constitution, and may include an HDD (Hard Disk Drive). The music reproducing program P may be stored in the storage section 12 of the smartphone 1 at factory shipment, or may be downloaded from a server, not shown, via the NW communication section 16, described later, and stored in the storage section 12 of the smartphone 1.

The display section 13 displays various images (include still images and moving images), and is composed of a liquid crystal panel. The operating section 14 has operation keys for performing various settings, and a touch panel that is linked with the display section 13. A user can input various characters such as telephone numbers and mail addresses and set communication via the operating section 14. The speaker 15 outputs various audio such as music based on audio data output from the controller 11. The NW communication section 16 can be connected to an internet via a mobile phone network and a mobile phone base station, not shown. The smartphone 1 can telephone and communicate with another terminal via the NW communication section 16. The BT communication section 17 wirelessly communicates with a peripheral device, not shown, that supports the Bluetooth standards based on the Bluetooth standards.

(Converting Apparatus 4)

A converting apparatus 4 includes a connectors 41 and 42 and a USB host controller 43. The connector 41 is a male type connector that corresponds to the connector 18 of the smartphone 1. The connector 18 of the smartphone 1 and the connector 41 of the converting apparatus 4 are connected, so the smartphone 1 and the converting apparatus 4 are connected. The connector 42 is a female type connector of USB A type. The USB host controller 43 is a controller for performing communication that supports the USB standards with a USB device (in this embodiment, the USB DAC 2). The smartphone 1 is connected to the converting apparatus 4, so the smartphone 1 functions as a USB host.

(USB DAC 2)

The USB DAC 2 includes a controller 21, a storage section 22, a display section 23, an operating section 24, a D/A converter 25, an amplifier section 26, a connector 27, a USB device controller 28, and a headphone terminal 29. The controller 21 controls respective sections composing the USB DAC 2 according to a control program.

The storage section 22 is composed of a RAM that functions as a main memory of the controller 21 and a ROM for storing the control program. The storage section 22 is not limited to the illustrated constitution, and may include a flash memory. The display section 23 displays a setting screen and is composed of a LCD (Liquid Crystal Display) and LED lamps. The operating section 24 is for accepting user operations and is composed of operation keys that are provided at a casing of the USB DAC 2. The D/A converter 25 converts the digital audio data output from the smartphone 1 into the analog audio data. The D/A converter 25 can convert PCM data and DSD data into the analog audio data. The amplifier section 26 amplifies the analog audio data into which the D/A converter 25 converts and outputs amplified analog audio data to the headphone terminal 29.

The connector 28 is a female type connector of USB micro B type. The connector 42 of the converting apparatus 4 and the connector 27 of the USB DAC 2 are connected by a USB cable 5, so the converting apparatus 4 and the USB DAC 2 are connected. The USB device controller 28 is for performing communication that supports the USB standards with the USB host (in this embodiment, the smartphone 1). The USB DAC 2 functions as a USB device by the USB device controller 28. In this embodiment, the smartphone 1 and the USB DAC 2 perform communication that supports the USB audio class. The headphone 3 is connected to the headphone terminal 29 and audio such as music is output from the headphone 3 based on the analog audio data.

After the music reproducing program P is activated, the digital audio data that is selected by the user operation of the operating section 14 is output from the smartphone 1 to the USB DAC 2. Process that the controller 11 executes according to the music reproducing program P is described below. The controller 11 controls display of the display section 13 (display controlling process). The controller 11 accepts instruction toward the smartphone 1 (accepting process). Concretely, the controller 11 accepts selection of digital audio data that is output to the USB DAC 2. For example, as illustrating in FIG. 2, the controller 11 displays information of the digital audio data that is stored in the storage section 12 at the display section 13. When the information of the digital audio data that is displayed at the display section 13 is touched by a user, the controller 11 accepts the selection of the digital audio data that is touched by the touch panel of the operating section 14. The digital audio data includes PCM data (first digital audio data) and DSD data (second digital audio data) of different data format from PCM data. For this reason, the controller 11 accepts the selection of output of PCM data to the USB DAC 2 or the selection of DoP output of DSD data to the USB DAC 2.

The controller 11 outputs the digital audio data that includes PCM data and DSD data to the USB DAC 2 (reproducing process). The controller 11 outputs the digital audio data selection of which is accepted to the USB DAC 2. After the controller 11 outputs the digital audio data selection of which is accepted to the USB DAC 2, it outputs the digital audio data according to a list of an album including the digital audio data to the USB DAC 2, for example.

Figure 6:
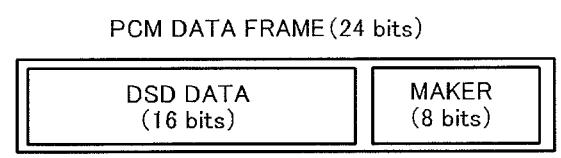
FIG. 6 is a diagram illustrating DSD data that is stored in frames of PCM data.
Figure 7:
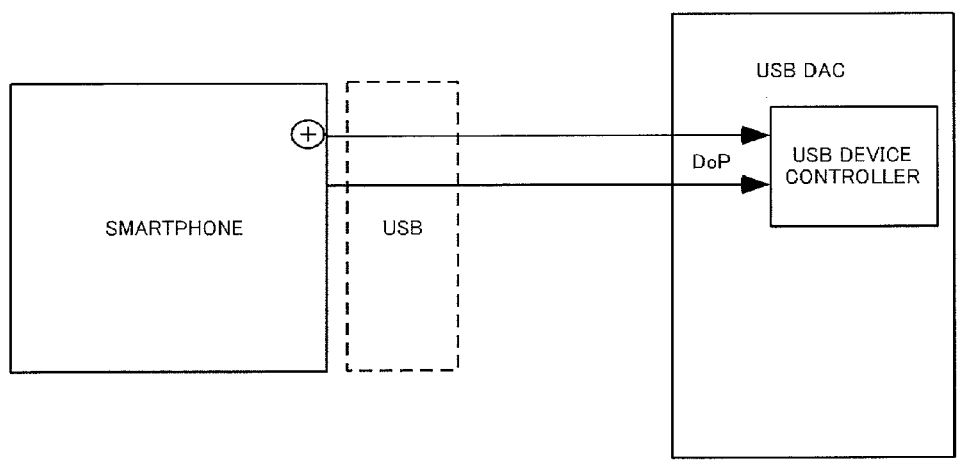
FIG. 7 is a diagram illustrating a concept of DoP output.
Figure 8:
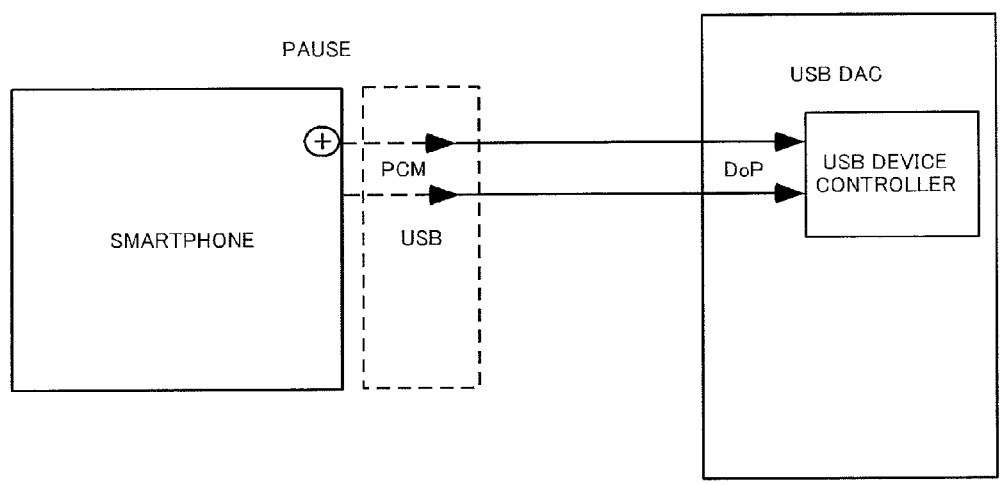
FIG. 8 is a diagram illustrating an example switching from output of DSD data (DoP output) to output of PCM data.

When the digital audio data that the controller 11 outputs to the USB DAC 2 is DSD data, the controller 11 outputs the DSD data to the USB DAC 2 by DoP. As illustrating in FIG. 6, the controller 11 stores a marker that includes information representing that it is DSD data and DSD data in frames of PCM data and outputs the marker and the DSD data to the USB DAC 2. When the digital audio data that the controller 11 outputs to the USB DAC 2 is PCM data, the controller 11 outputs the PCM data to the USB DAC 2.

Figure 3:
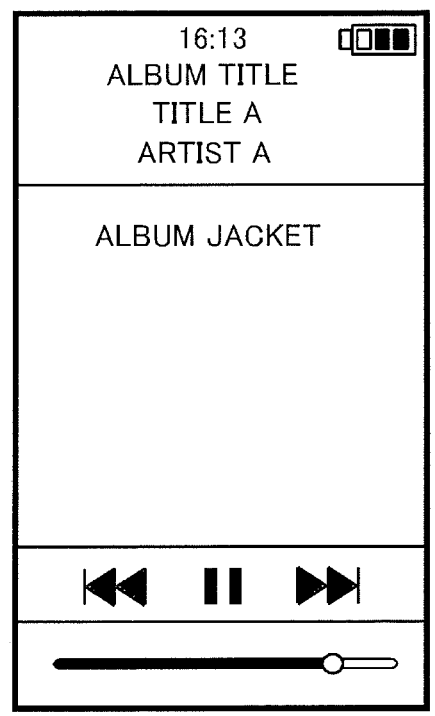
FIG. 3 illustrates one example of a player screen.

When the controller 11 accepts the selection of the digital audio data that is output to the USB DAC 2, it displays a player screen at the display section 13, as illustrated in FIG. 3. The player screen includes a pause button for accepting pausing instruction of outputting the digital audio data to the USB DAC 2 and a scroll bar representing a progress state of outputting the digital audio data to the USB DAC 2. While the digital audio data is being output to the USB DAC 2 (while reproducing digital audio data), the controller 11 displays that the digital audio data is being output to the USB DAC 2 by moving a slider of the scroll bar from left to right at the player screen.

When the pause button that is displayed at the display section 13 is touched by the user, the controller 11 accepts the pausing instruction of outputting the digital audio data to the USB DAC 2 by the touch panel of the operating section 14. Herein, the controller 11 stores player status that includes "reproducing" representing that the digital audio data is being output to the USB DAC 2 and "pausing" representing that outputting the digital audio data to the USB DAC 2 is paused. When the controller 11 accepts the pausing instruction of outputting the digital audio data to the USB DAC 2, it sets the player status from "reproducing" to "pausing". At the same time, the controller 11 stops moving of the slider of the scroll bar and allows the display section 13 to display that outputting the digital audio data to the USB DAC 2 is in a pausing state (pausing state of reproducing the digital audio data).

When the controller 11 accepts the pausing instruction while outputting DSD data to the USB DAC 2 by DoP, it outputs mute data that represents silence of DSD data to the USB DAC 2. The mute data that represents silence of DSD data is composed of "10010110". When the controller 11 accepts the pausing instruction while outputting PCM data to the USB DAC 2, it outputs zero data that represents silence of PCM data to the USB DAC 2. The zero data that represents silence of PCM data is composed of "0". Herein, the zero data is composed of only "0" and is described as "zero data". Meanwhile, the mute data includes values other than "0" and is described as "mute data".

The controller 11 controls the USB DAC 2 (USB DAC controlling process). Concretely, the controller 11 sends a command that supports the USB audio class to the USB DAC 2 so as to control the USB DAC 2. For example, the controller 11 sends a command instructing activation to the USB DAC 2 so as to activate the USB DAC 2. For example, the controller 11 sends a command instructing stop to the USB DAC 2 so as to stop the USB DAC 2.

After the controller 11 starts outputting the mute data to the USB DAC 2 and predetermined time passes, it sends the command instructing stop so as to stop the USB DAC 2. Herein, when the controller 11 accepts the pausing instruction while outputting DSD data to the USB DAC 2 by DoP, it does not stop the USB DAC 2. On the other hand, when the controller 11 accepts the pausing instruction while outputting PCM data to the USB DAC 2, it sends the command instructing stop to the USB DAC 2 so as to stop the USB DAC 2.

Figure 4:
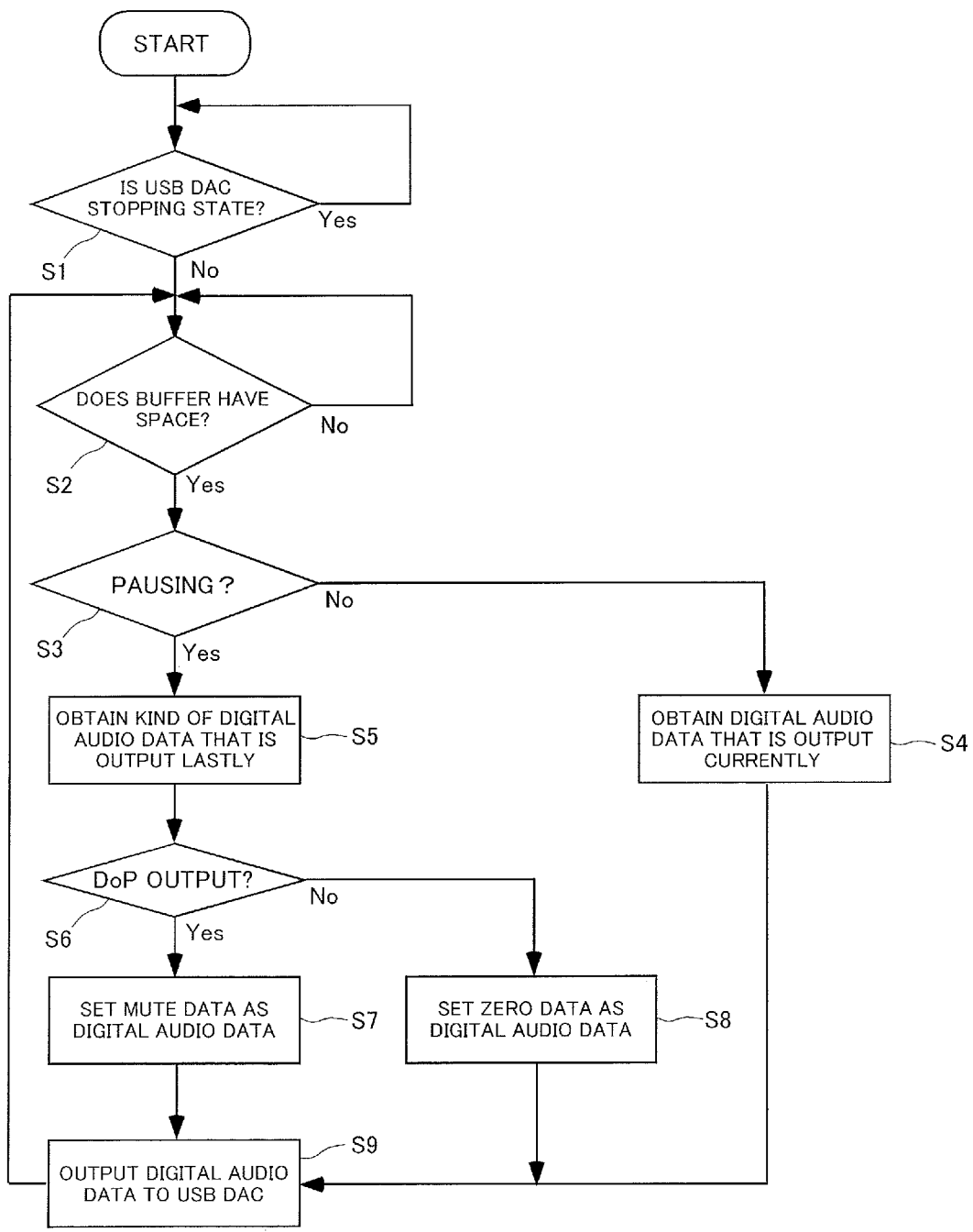
FIG. 4 is a flowchart illustrating a processing operation of the smartphone for receiving request of the digital audio data from a USB DAC.

A processing operation of the smartphone 1 for receiving request of the digital audio data from the USB DAC 2 is described with reference to a flowchart shown in FIG. 4 below. The controller 11 determines whether the USB DAC 2 is in a stopping state or not (S1). While the controller 11 determines that the USB DAC 2 is in the stopping state (S1: Yes), it stands by with repeating process of S1. When the controller 11 determines that the USB DAC 2 is not in the stopping state, namely, is in an activating state (S1: No), it determines whether a buffer for output in the storage section 12 has space or not (S2). While the controller 11 determines that the buffer does not have space (S2: No), it stands by with repeating process of S2.

When the controller 11 determines that the buffer has space (S2: Yes), it determines whether the player status is "pausing" or not (S3). When the controller 11 determines that the player status is not "pausing", namely, is "reproducing" (S3: No), it obtains the digital audio data that is output to the USB DAC 2 from the storage section 12 currently (S4). On the other hand, when the controller 11 determines that the player status is "pausing" (S3: Yes), it obtains kind of the digital audio data (DSD data (DoP output) or PCM data) that is output to the USB DAC 2 lastly, namely, before pausing (S5).

Next, the controller 11 determines whether obtained kind of the digital audio data is DSD data, namely, whether DSD data is output by DoP or not (S6). When the controller 11 determines that obtained kind of digital audio data is DSD data, namely, DSD data is output by DoP (S6: Yes), it sets the mute data as the digital audio data that is output to the USB DAC 2 (S7). On the other hand, when the controller 11 determines that obtained kind of the digital audio data is not DSD data (is PCM data), namely, DSD data is not output by DoP (PCM data is output) (S6: No), it sets the zero data as the digital audio data that is output to the USB DAC 2 (S8). Then, the controller 11 outputs the digital audio data obtained in S4 or the digital audio data set in S7 or S8 to the USB DAC 2 (S9). After process of S9, the controller 11 executes process of S2.

Figure 5:
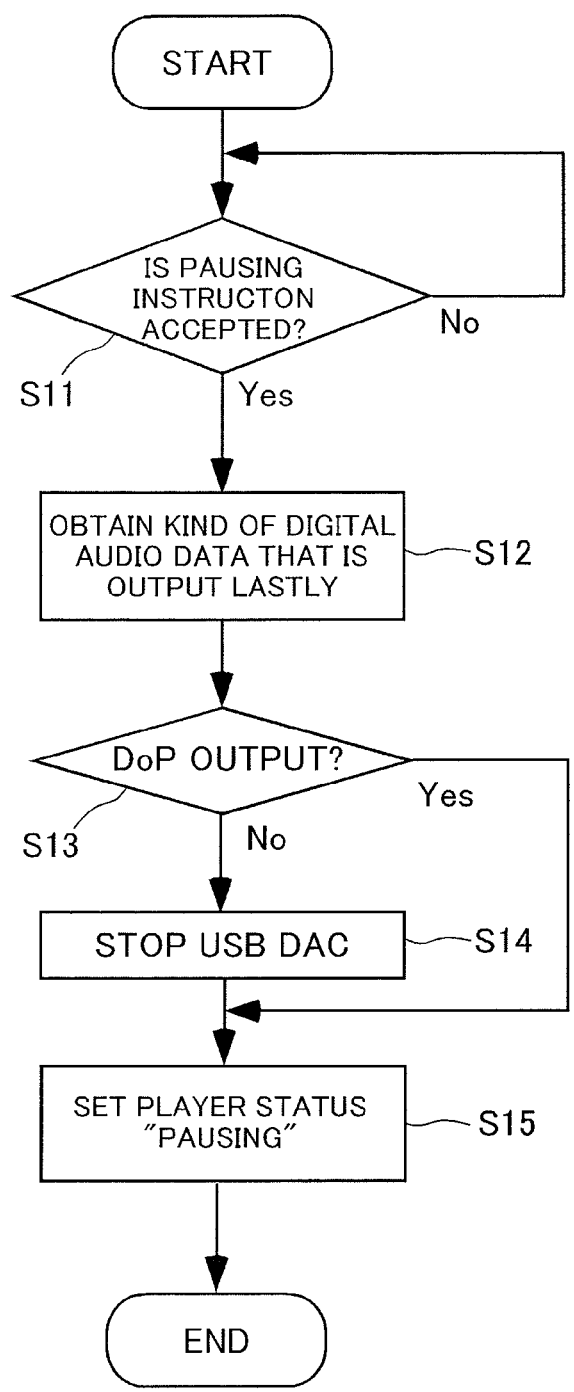
FIG. 5 is a flowchart illustrating a processing operation of the smartphone for accepting pausing instruction of outputting the digital audio data to the USB DAC.

Next, a processing operation of the smartphone 1 for accepting the pausing instruction of outputting the digital audio data to the USB DAC 2 is described with reference to a flowchart shown in FIG. 5. The controller 11 determines whether it accepts the pausing instruction of outputting the digital audio data to the USB DAC 2 or not (S11). While the controller 11 determines that it does not accept the pausing instruction (S1: No), it stands by with repeating process of S11. When the controller 11 determines that it accepts the pausing instruction (S11: Yes), it obtains kind of the digital audio data that is output to the USB DAC 2 lastly, namely, before pausing (S12). The controller 11 determines whether obtained kind of the digital audio data is DSD data, namely, DSD data is output by DoP (S13). When the controller 11 determines that obtained kind of the digital audio data is not DSD data (is PCM data), namely, DSD data is not output by DoP (PCM data is output) (S13: No), it stops the USB DAC 2 (S14). Next, the controller 11 sets the player status "pausing" (S15).

When the controller 11 determines that obtained kind of the digital audio data is DSD data, namely, DSD data is output by DoP (S13: Yes), it does not execute process of S14 and executes process of S15. Therefore, the USB DAC 2 is not stopped.

In this embodiment, as described above, when the controller 11 accepts the pausing instruction while outputting DSD data to the USB DAC 2 by DoP, it outputs the mute data representing the silence of DSD data to the USB DAC 2. Therefore, since the silence is output from the USB DAC 2 according to the mute data, generation of noises from USB DAC 2 is prevented when stopping instruction of the digital audio data is accepted while DSD data is being output to the USB DAC 2.

Herein, while the mute data is being output, the USB DAC 2 converts the mute data (the digital audio data) into the silence (the analog audio data). For this reason, electric power is consumed in the USB DAC 2. In this embodiment, after the controller 11 starts outputting the mute data to the USB DAC 2 and predetermined time passes, it stops the USB DAC 2. Thus, since the USB DAC 2 stops, electric power consumption of the USB DAC 2 can be repressed.

Further, when the pausing instruction is accepted while PCM data is being output to the USB DAC 2 and the USB DAC 2 is stopped, noises are not generated from the USB DAC 2. For this reason, in this embodiment, when the controller 11 accepts the pausing instruction while outputting PCM data to the USB DAC 2, it stops the USB DAC 2.

Further, in this embodiment, when the controller 11 accepts the pausing instruction, it allows the display section 13 to display that outputting the digital audio data to the USB DAC 2 is in the pausing state. Thus, the user understands that outputting the digital audio data to the USB DAC 2 is paused.

Further, in this embodiment, the controller 11 stores the marker that includes the information representing it is DSD data and DSD data in frames of PCM data and outputs the marker and DSD data to the USB DAC 2. Thus, in communication between the smartphone 1 and the USB DAC 2 according to the USB audio class that supports PCM data while does not support DSD data, DSD data can be output from the smartphone 1 to the USB DAC 2.

The embodiment of the present invention is described above, but the mode to which the present invention is applicable is not limited to the above embodiment and can be suitably varied without departing from the scope of the present invention.

The above embodiment describes the case where PCM data (first digital audio data) and DSD data (second digital audio data) are output from the smartphone 1 to the USB DAC 2. The digital audio data that is output from the smartphone 1 to the USB DAC 2 is not limited to PCM data and DSD data, and the digital audio data of different data format may be output from the smartphone 1 to the USB DAC 2.

The above embodiment describes the processing operation of the controller 11 for accepting the pausing instruction of outputting the digital audio data to the USB DAC 2. Not limited to this, when the controller 11 accepts stopping instruction of outputting the digital audio data to the USB DAC 2, the same processing may be performed.

The above embodiment describes the case where the smartphone 1 does not include a USB host controller. Not limited to this, the smartphone may include the USB host controller (for example, a smartphone that loads Android (registered trademark) OS made by Google Inc.) and the smartphone and the USB DAC may be connected by the USB cable.

The above embodiment describes the case where the music reproducing program is installed in the smartphone and the smartphone is functioned as the music reproducing apparatus. Not limited to this, an equipment that is functioned as the music reproducing apparatus may be a tablet PC, a feature phone, a mobile gaming apparatus or the like.

In the above embodiment, the USB DAC 2 outputs the analog audio data to the headphone 3. Not limited to this, the USB DAC 2 may output the analog audio data to a speaker or the like other than the headphone.

The present invention can be suitably employed in a music reproducing apparatus for reproducing music.

What is claimed is:

1. A music reproducing apparatus comprising: a controller for outputting digital audio data that includes first digital audio data and second digital audio data of different data format from the first digital audio data to a D/A converter,
   for accepting stopping instruction of outputting the digital audio data to the D/A converter, and
   for controlling the D/A converter, wherein
   the controller outputs the second digital audio data to the D/A converter to be converted as mute audio data representing silence when it accepts the stopping instruction while outputting the second digital audio data to the D/A converter, and
   stops the D/A converter after it starts outputting the mute audio data to the D/A converter and predetermined time passes.

2. The music reproducing apparatus according to claim 1, wherein the controller stops the D/A converter when it accepts the stopping instruction while outputting the first digital audio data to the D/A converter.

3. The music reproducing apparatus according to claim 1, further comprising: a display section, wherein
   the controller further controls display of the display section, and allows the display section to display that outputting the digital audio data to the D/A converter is in a stopping state when it accepts the stopping instruction.

4. The music reproducing apparatus according to claim 1, wherein the controller stores a marker that includes information representing it is the second digital audio data and the second digital audio data in frames of the first digital audio data and outputs the marker and the second digital audio data to the D/A converter.

5. The music reproducing apparatus according to claim 1, wherein the first digital audio data is PCM data, and
   the second digital audio data is DSD data.

6. A non-transitory computer-readable storage medium in which a music reproducing program is stored, the music reproducing program allows a controller of a computer to output digital audio data that includes first digital audio data and second digital audio data of different data format from the first digital audio data to a D/A converter,
   to accept stopping instruction of outputting the digital audio data to the D/A converter, and
   to control the D/A converter,
   the music reproducing program allows the controller to output the second digital audio data to the D/A converter to be converted as mute audio data representing silence when it allows the controller to accept the stopping instruction while allowing the controller to output the second digital audio data to the D/A converter, and
   to stop the D/A converter after it starts outputting the mute audio data to the D/A converter and predetermined time passes.

\* \* \* \* \*

UNITED STATES PATENT AND TRADEMARK OFFICE
CERTIFICATE OF CORRECTION

PATENT NO. : 9,569,166 B2
APPLICATION NO. : 14/851108
DATED : February 14, 2017
INVENTOR(S) : Nobuya Tachimori Page 1 of 1

It is certified that error appears in the above-identified patent and that said Letters Patent is hereby corrected as shown below:

On the Title Page

Item (30), Foreign Application Priority Data Section, "2014-192405" should read --2014-192045--.

Signed and Sealed this
Ninth Day of May, 2017

Michelle K. Lee
*Director of the United States Patent and Trademark Office*